United States Patent [19]

Parsons et al.

[11] Patent Number: 5,128,045
[45] Date of Patent: Jul. 7, 1992

[54] METHOD FOR STABILIZING METAL IONS IN THE PRESENCE OF BIOFOULING ORGANISMS

[75] Inventors: Jennifer R. Parsons, Pittsburg; Beverly Bendiksen, Coraopolis; Charles J. Schell, Coraopolis, all of Pa.

[73] Assignee: Calgon Corporation, Pittsburgh, Pa.

[21] Appl. No.: 616,143

[22] Filed: Nov. 20, 1990

[51] Int. Cl.$^5$ .................................. C02F 1/50
[52] U.S. Cl. ..................... 210/699; 210/700; 210/701; 252/180; 514/515
[58] Field of Search .............. 71/67; 210/698–701, 210/764; 252/180, 181; 514/514, 515

[56] References Cited

U.S. PATENT DOCUMENTS

| | | | |
|---|---|---|---|
| 3,674,457 | 7/1972 | Wolfson | 514/515 |
| 3,898,343 | 8/1975 | Swered et al. | 514/515 |
| 4,324,793 | 4/1982 | Hagen et l. | 514/387 |
| 4,552,665 | 11/1985 | Ralston et al. | 210/701 |
| 4,612,328 | 9/1986 | Jakubowski | 514/515 |
| 4,719,083 | 1/1988 | Baker et al. | 210/698 |

Primary Examiner—Peter Hruskoci
Attorney, Agent, or Firm—W. C. Mitchell; C. M. Caruso

[57] ABSTRACT

A method for stabilizing metal ions in recirculating water systems is disclosed. This method utilizes an admixture comprising a) an ethylenically unsaturated water-soluble polymer and/or a water soluble phosphonate, b) methylene bis(thiocyanate), and c) 2-(thiocyanomethylthio)benzothiazole to solubilize metal ions thereby reducing deposition and corrosion.

2 Claims, No Drawings

METHOD FOR STABILIZING METAL IONS IN THE PRESENCE OF BIOFOULING ORGANISMS

BACKGROUND OF THE INVENTION

Many metal ions are essentially insoluble in aqueous systems having pH's ranging from approximately 6.0 to 9.0. Within this pH range, these metals, including but not limited to iron, zinc, aluminum and manganese, will deposit on heat transfer surfaces causing underdeposit attack.

Recirculating cooling water utilized in industrial applications may contain metal ions, such as iron and manganese which, upon deposition as insoluble salts on heat transfer surfaces, cause decreased operating efficiency and corrosive attack.

These concerns are particularly pertinent to recirculating cooling water systems employed by large utility plants.

Water treatment to prevent scale, corrosion and biological fouling in industrial and municipal aqueous systems is a complicated problem under the best of circumstances. Cooling water in utility plants, for example, may be particularly difficult to treat, especially when the source water contains high concentrations of iron and/or manganese. Also, such plants may be operated at several cycles of concentration. The resulting high levels of iron and manganese pose a challenge to conventional polymer treatment programs designed to stabilize these metals and prevent or inhibit deposits. The added problem of the presence of fouling microorganisms such as bacteria, particularly sulfate reducing bacteria, in the recirculating water generally mandates the use of an aggressive biological treatment program. Balancing the whole range of treatment needs makes it desirable that treatment additives not be antagonistic to one another. Of course, the treatment approach utilized must also take into account the extremes of plant operating parameters such as water quality, pH, cycles of concentration and temperature. All of these factors must be considered to determine the performance limits of any treatment additives utilized.

Polymers and phosphonates, alone and in combination, have been used in the past to stabilize deposit-forming metals ions such as $Fe^{2+}$, $Fe^{3+}$, and $Mn^{2+}$. See for example U.S. Pat. Nos. 4,936,987, 4,640,793, 4,783,267 and 4,552,665. For many cooling towers, chlorine has been used as the biocide. Unfortunately, such biocides may inhibit the ability of polymer and/or phosphonate programs to stabilize metal ions. The instant inventors have surprisingly found that combinations of methylene bis(thiocyanate) and 2-(thiocyanomethylthio)benzothiazole, conventional biocides, enhance the ability of conventional water treatment polymers and/or phosphates to stabilize metal ions. This benefit of the instant biocide compositions is surprising and unexpected.

Hence, a long-felt need in the art of water treatment to find an effective biocide which does not antagonize metal ions stabilization by polymers and/or phosphonates has been met.

The use of methylene bis(thiocyanate) is well known in the art. See, for example, U.S. Pat. Nos. 4,612,328, 3,996,378, 3,300,375 and 3,524,871. However, its surprising effect on the ability of polymers and/or phosphonates to stabilize metal ions is not known or suggested in the art. Calgon product H-102 is a blend of 10% methylene bis(thiocyanate) and 10% 2-(thiocyanomethylthio)benzothiazole, on an active weight basis.

SUMMARY OF THE INVENTION

The present invention is directed to an admixture for the control, prevention and/or inhibition of biofouling and for the stabilization of metal ions, particularly iron and manganese ions, in an aqueous system comprising a) an ethylenically unsaturated water soluble polymer and/or a water soluble phosphonate, b) methylene bis(-thiocyanate) and c) 2-(thiocyanomethylthio)benzothiazole.

The present invention is also directed to a method for stabilizing metal ions in the presence of biofouling organisms, and for controlling, preventing and/or inhibiting biofouling comprising adding to an aqueous system containing metal ions and biofouling organisms an effective amount of an admixture comprising a) an ethylenically unsaturated, water soluble polymer and/or a water soluble phosphonate, b) methylene bis(thiocyanate) and c) 2-(thiocyanomethylthio)benzothiazole.

The present invention is further directed to a method for enhancing the ability of water soluble ethylenically unsaturated polymers and/or phosphonates to stabilize metal ions in aqueous systems prone to biofouling comprising adding an effective amount of methylene bis(thiocyanate) and 2-(thiocyanomethylthio)benzothiazole to said polymers and/or phosphonates or to an aqueous system treated with said polymers and/or phosphonates.

As used herein, the term "aqueous system" is meant to include any system containing water, including but not limited to cooling water systems, boiler water systems, desalination systems, gas scrubber systems, blast furnace systems, sewage sludge thermal conditioning systems, reverse osmosis systems, evaporators, paper processing systems, mining circuits, etc. The preferred aqueous systems are cooling water systems, either once-through or closed loop.

The term "stabilizing metal ions", as used herein, refers to the ability of additives to keep metal ions in solution under conditions where, absent the additive, the ions would tend to precipitate out of solution. Thus, these additives either solubilize ions or maintain ions in a soluble state, thereby inhibiting the formation and/or deposition of metallic salts on to the surfaces of aqueous systems.

The term "effective amount", as used herein, refers to the amount of additive necessary to accomplish the objective for which the additive is being used in a given aqueous system.

The instant inventors have discovered that methylene bis(thiocyanate)/2-(thiocyanomethylthio)benzothiazole compositions enchance the ability of conventional water treatment polymers and phosphonates to stabilize metal ions. This use of such compositions is surprising and unexpected.

DETAILED DESCRIPTION OF THE INVENTION

In the broadest sense, the instant invention relates to compositions comprising: a) a water soluble, ethylenically unsaturated polyer and/or a water soluble phosphonate; b) methylene bis(thiocyanate); and c) 2-(thiocyanomethylthio)benzothiazole, wherein the polymer to phosphonate weight ratio of a), if a phosphonate is used, ranges from about 99:1 to about 1:99 and wherein the weight ratio of a) to the sum of b) and c) ranges from about 99:1 to about 1:99. Also, the weight ratio of b) to c) ranges from about 99:1 to about 1:99. Additionally, such compositions may comprise the water of an aqueous system, wherein said water contains metal ions selected from the group consisting of $Fe^{+2}$, $Fe^{+3}$, $Zn^{+2}$, $Al^{+3}$, and $Mn^{+2}$ and biofouling organisms.

More particularly, the instant invention is directed to a method for stabilizing metal ions in the presence of biofouling organisms and for controlling, preventing and/or inhibiting biofouling, comprising adding to an aqueous system containing metal ions and biofouling organisms an effective amount of a composition comprising: a) a water soluble, ethylenically unsaturated polymer and/or a water soluble phosphonate; b) methylene bis(thiocyanate); and c) 2-(thiocyanomethylthio)-benzothiazole.

Further, the instant invention is directed to improved ethylenically unsaturated, water soluble polymer/water soluble phosphonate compositions which additionally comprise methylene bis(thiocyanate) and 2-(thiocyanomethylthio)benzothiazole and to a method for enhancing the ability of polymer and/or phosphonate compositions to stabilize metal ions in aqueous systems comprising adding to such compositions or to aqueous systems in which they are present an effective amount of a composition comprising methylene bis(thiocyanate) and 2-(thiocyanomethylthio)benzothiazole.

The instant invention also relates to an improved method for treating an aqueous system, preferably a recirculating cooling water system, which method comprises adding to the system being treated an effective amount of a composition comprising: a) an ethylenically unsaturated water soluble polymer and/or a water soluble phosphonate; b) methylene bis(thiocyanate); and c) 2-(thiocyanomethylthio)benzothiazole.

Any ethylenically unsaturated, water-soluble polymer may be used as component (a). For example, water soluble polycarboxylates may be used. Such polycarboxylates include, but are not limited to, polymers derived from acrylic acid, methyacrylic acid, vinyl acetic acid, allyl acetic acid, fumaric acid, phosphoric carboxylic acid, maleic acid (and/or its anhydride), itaconic acid, α-halo acrylic acid and β-carboxyethyl acrylate, alone or in combination, and salts, thereof.

Specific examples of acceptable polymers include homopolymers of acrylic acid or methacrylic acid, copolymers of acrylic acid and methacrylic acid, homopolymers of maleic acid or anhydride, copolymers of any of the above monomers with acrylamide or methacrylamide, hydrolyzed polyacrylamides, copolymers of acrylic acid and hydroxypropyl acrylate, copolymers of maleic acid or anhydride and sulfonated styrene and sulfonated polystyrenes.

A preferred polymer is a water soluble polymer having a weight average molecular weight of less than about 50,000 as determined by low angle laser light scattering comprising i) an unsaturated carboxylic acid selected from the group consisting of acrylic acid, methacrylic acid, α-halo acrylic acid, maleic acid or anhydride, itaconic acid or anhydride, vinyl acetic acid, allyl acetic acid, fumaric acid, β-carboxyethyl acrylate, their salts, and mixtures thereof, and ii) an unsaturated sulfonic acid selected from the group consisting of 2-acrylamido-2-methylpropylsulfonic acid, 2-methacrylamido-2-methylpropylsulfonic acid, vinyl sulfonic acid, sulfoalkyl acrylate, sulfoalkyl methacrylate, allyl sulfonic acid, methally sulfonic acid, and 3-methacrylamido-2-hydroxypropyl sulfonic acid.

Such preferred polymers may also comprise iii) an unsaturated polyalkylene acid moiety, such as allyl polyethylene glycol, methally polyethylene glycol, polyethylene glycol acrylate, polyethylene glycol methacrylate, methoxy allyl polyethylene oxide, alkoxyallyl polyethylene oxide and the polypropylene equivalents thereof. Also, mixtures of polyethers formed from polyethylene oxide with other polyalkylene oxides, such as propylene or butylene oxide may be used. The polyether chain may be capped with an alkyl, aralkyl, sulfonate or phosphonate group, a metal ion, or uncapped.

If moiety iii) is used, the polymer preferably comprises about 35 to about 90% by weight, i), about 5 to about 40%, by weight, ii), and about 5 to about 40%, by weight, iii).

More preferred polymers are selected from the group consisting of the following water soluble polymers: homopolymers of acrylic acid, homopolymers of methylacrylic acid, homopolymers of maleic acid or anhydride, polymers comprising i) acrylic acid, methacrylic acid or maleic acid and ii) acrylamide or methacrylamide, hydrolyzed polyacrylamides, polymers comprising i) acrylic acid and ii) hydroxy propyl acrylate, polymers comprising i) maleic acid and ii) sulfonated styrene, sulfonated polystyrenes and polymers comprising i) acrylic acid or methacrylic acid and ii) 2-acrylamido-2-methylpropyl sulfonic acid or 2-methacrylamido-2-methylpropyl sulfonic acid. These preferred polymers are water soluble and have molecular weights of less than about 50,000 as determined by light scattering techniques.

The most highly preferred polymers are selected from the group consisting of water-soluble polymers having a weight average molecular weight of less than 50,000 as determined by light scattering comprising:
 (i) an unsaturated mono-carboxylic acid selected from the group consisting of acrylic acid and methacrylic acid; and
 (ii) an unsaturated sulfonic acid selected from the group consisting of 2-acrylamido-2-methylpropyl sulfonic acid and 2-methacrylamido-2-methylpropyl sulfonic acid;
wherein the weight ratio of (i):(ii) ranges from about 1:4 to about 4:1. Such polymers are commerically available from Calgon Corporation, Pittsburgh, Pa. as TRC-233 ®.

Any water soluble phosphonate may additionally be used with the above polymers as a portion of component (a). Examples include, but are not limited to, 2-phosphono-1,2,4-tricarboxybutane, amino tri(methylene phosphonic acid), hydroxyethylidene diphosphonic acid, phosphonosuccinic acid, benzene phosphonic acid, 2-aminoethyl phosphonic acid polyamino phosphonates and the like. Additional phosphonates are identified in U.S. Pat. No. 3,837,803, which is hereby incorporated by reference. The preferred phosphonates are 2-phosphono-1,2,4-tricarboxybutane, amino tri(-methylene phosphonic acid) and hydroxyethylidene diphosphonic acid, all of which are commercially available. If a phosphonate is used, the ratio of polymer to phosphonate, on an active weight basis, should range from about 99:1 to about 1:99, preferably from about 50:1 to about 1:50, and most preferably from about 20:1 to about 1:20.

Component (b) is methylene bis(thiocyanate) (hereinafter also referred to as MBT). MBT is commerically available from Calgon Corporation, Pittsburgh, Pa. Component (c) is 2-(thiocyanomethylthio)benzothiazole.

The weight ratio of component a) to the sum of components b) and c) in the instant admixtures ranges from about 99:1 to about 1:99, preferably from about 50:1 to about 1:20, and most preferably from about 20:1 to about 1:10. The weight ratio of component b) to component c) should range from about 99:1 to about 1:99, preferably from about 50:1 to about 1:50. Preferably, the amount of b) and c) necessary is determined based upon the characteristics of the aqueous system to be treated, such as its potential for biofouling, and the concentration of metal ions present. It should be noted that virtually any amount of b) and c) is believed to enhance the efficiacy of polymer and/or phosphonate compositions with respect to metal ion stabilization. However, an enhancing amount may be inadequate to control biofouling. Most preferably, the weight ratio of components b) and c) to component a) ranges from about 10:1 to about 1:20.

An effective amount of the instant composition should be used, based on the characteristics of the system being treated. Preferably, at least about 0.1 ppm of the instant composition should be used, more preferably about 1 to about 100 ppm. Order of addition is not believed to be critical. Thus, the individual components of a), and components b) and c) may be added, separately or in some combination thereof, to the aqueous system being treated. Methods of addition are well known to those skilled in the art of water treatment.

Exemplary of the best mode is addition of an effective amount for a given system of a composition comprising:
 a) Calgon polymer TRC-233 which is a 60/40 w/w acrylic acid/AMPSA copolymer, and HEDP (hydroxyethylidene diphosphonic acid) at a weight ratio ranging from about 10:1 to about 1:1;
 b) MBT; and
 c) 2-(thiocyanomethylthio)benzothiazole; wherein the weight ratio of a):b) ranges from about 20:1 to about 1:2 and wherein the weight ratio of b):c) ranges from about 10:1 to about 1:10.

EXAMPLES

The following examples are intended to further demonstrate the invention, They are not, however, intended to limit the invention in any way.

METAL STABILIZATION TESTS

Base Water Preparation

Synthetic recirculating water was prepared based on that of a large utility plant operating at three cycles of concentration. The synthetic cooling tower water contained 9 ppm iron and 3 ppm manganese, with the remaining dissolved solids listed in Table 1. To facilitate the setup of several stabilization tests, the base water was prepared in ten liter batches by adding $MgSO_4$, $CaCl_2.H_2O$, $CaSO_4$ and $NaHPO_4$ to 10 L of distilled, deionized water. The weights of these salts are listed in Table 1.

TABLE 1
SYNTHETIC 3X RECIRCULATING WATER

| Ion | Synthetic Water Ion Concentration (mg/L) | Ion Source | g per 10 L |
|---|---|---|---|
| $Mg^{++}$ | 39 | $MgSO_4$ | 1.926 |
| $Ca^{++}$ | 150 | $CaCl_2.H_2O$ | 2.664 |
|  |  | $CaSO_4$ | 2.673 |
| $PO_4^{3-}$ | 3 | $Na_2HPO_4$ | 0.043 |
| $HCO_3$ | 305 | $NaHCO_3$ | $^a$2.754 |
| $SiO_2$ | 36 | $Na_2SiO_3.9H_2O$ | $^b$0.568 |
| $SO_4^{2-}$ | 340 | $MgSO_4$ | — |
|  |  | $CaSO_4$ | — |
| $Cl^-$ | 128.5 | $CaCl_2.2H_2O$ | — |
| $Na^+$ | 131 | $Na_2HPO_4$ | — |
|  |  | $NaHCO_3$ | — |
|  |  | $Na_2SiO_3.9H_2O$ | — |

$^a$added from a 84 g $NaHCO_3$/L solution (5 ml/1000 ml)
$^b$added from a 34.08 g $Na_2SiO_3.9H_2O$/L solution (5 ml/1000 ml)

Test Procedure

The test apparatus consisted of one liter beakers and gang stirrers. The base water was added to the beakers, followed by 5 mL of 34.8 g/L $Na_2SiO_3.9H_2O$ and 5 mL of 1.0M $NaHCO_3$. The chemical treatment and biocide, if present, were added next from 20 g/L product solutions. The next component added was chlorine to accelerate the oxidation of the metals, especially manganese. It was pipetted from a freshly prepared solution of 190.5 g/L Clorox, standardized before use. Iron and manganese were then added from atomic absorption reference standards (1 mL/1000 mL = 1 ppm metal ion). The total test volume was 1000 mL at the end of these additions and the pH was then adjusted to 8.5 with 1.0N NaOH. The beakers were placed under a gang stirrer at room temperature at 60 rpm for 24 hours, after which time they were removed and an aliquot filtered through Whatman 41 filter paper (25 μm filter paper). A 50 mL sample of the filtrate was digested with 0.25 mL concentrated nitric acid and 2.5 mL concentrated HCl.

Atomic absorption analysis was used to determine the concentration of $Fe^{3+}$ and $Mn^{2+}$. Percent stabilization of the metals was calculated using the following equation:

$$\% \text{ Stabilization} = \frac{([\text{metal}] \text{ final} - [\text{metal}] \text{ control})}{([\text{metal}] \text{ expected} - [\text{metal}] \text{ control})} \times 100\%$$

A summary of the abbreviations for various polymers, phosphonate and biocides utilized in the examples is shown in Table 2.

TABLE 2
PRODUCT DESCRIPTIONS

| ADDITIVE | ACTIVE INGREDIENT(S) | % ACTIVE | FUNCTION |
|---|---|---|---|
| AMP | Amino tri(methylene phosphonic acid) | 5.0 | Phosphonate |
| MBT/ TCMTB | Methylene bis(thiocyanate) and 2-(Thiocyanomethyl-thio)-benzothiazole, available from Calgon as H-102 | 10 10 | Biocide |
| DMAC | Dodecyl dimethyl ammonium chloride | 50 | Biocide |
| DGH | Dodecylguanidine hydrochloride | 12.50 | Biocide |
| GLU | Gluteraldehyde | 45 | Biocide |
| DBNPA | 2,2-Dibromo-3-nitrilopropionamide | 5 | Biocide |
| PENETRANT | The penetrant is an admixture of various |  |  |

TABLE 2-continued

PRODUCT DESCRIPTIONS

| ADDITIVE | ACTIVE INGREDIENT(S) | % ACTIVE | FUNCTION |
|---|---|---|---|
| | surfactants and polyacrylic acid, available from Calgon as CL-361 | | |
| KATHON* | 5-Chloro-2-methyl-4-isothiazoline-3-one and 2-methyl-4-isothiazoline-3-one | 1.15 / 0.35 | Biocide |
| NaBr | Sodium Bromide | 46 | Biocide |
| AA/AMPSA HEDP | Composition containing a 60/40 w/w acrylic acid/2-acylamindo-2-methyl propyl sulfonic acid polymer and hydroxyethylidene diphosphonic acid, commercially available from Calgon as PCL-402 | 20 / 3.7 | Polymer/ Phosphonate |
| AA/AMPSA | 60/40 acylic acid/2-acylamindo 2-methylpropyl sulfonic acid polymer, MW approx. 8200 | 30 | Polymer |
| HEDP | Hydroxyethylidene diphosphonic acid | 60 | Phosphonate |
| MI | Methylisothiazoline | | Biocide |

(*KATHON is a registered trademark of Rohm and Haas)

EXAMPLES 1-14

The test procedure was followed by employing a polymer and/or phosphonate and one of various biocides including H-102, DMAC, DGH, or DBNPA. The penetrant was also used. The results are shown in Table 3.

TABLE 3

IRON/MANGANESE STABILIZATION BY H-102 BIOCIDE

| Example Number | PCL-402 (mg/L) | PENETRANT (mg/L) | H-102 (mg/L) | % Stabilization Fe | % Stabilization Mn |
|---|---|---|---|---|---|
| 1 | 50 | 15 | 21 | 85 | 100 |
| 2 | 50 | 15 | — | 48 | 38 |
| 3 | 50 | — | 21 | 72 | 87 |
| 4 | 50 | — | — | 27 | 22 |
| 5 | 50 | — | 5 | 6 | 61 | 59 |

Conditions: Synthetic 3X Recirculating Water; pH 8-9; 9.0 mg/L Fe; 3.0 mg/L Mn; 5.0 mg/L Cl$_2$; 24 Hours; 60 rpm; 60° C.; 25 micron Filtration.

| Example Number | PCL-402 (mg/L) | PENETRANT (mg/L) | DMAC (mg/L) | ADDITIONAL BIOCIDE (mg/L) | % STABILIZATION Fe | % STABILIZATION Mn |
|---|---|---|---|---|---|---|
| 6 | 50 | 5.1 | 7.5 | — | 71 | 88 |
| 7 | 50 | 5.1 | 6.0 | — | 78 | 89 |
| 8 | 50 | 5.1 | 4.5 | — | 79 | 84 |
| 9 | 50 | 5.1 | 3.0 | — | 84 | 91 |
| 10 | 50 | — | 7.5 | — | 80 | 91 |
| 11 | 50 | 5.1 | — | — | 100 | 95 |
| 12 | 50 | 5.1 | 7.5 | 15 H-102 | 92 | 89 |
| 13 | 50 | 5.1 | 7.5 | 15 DBNPA | 74 | 89 |
| 14 | 50 | 5.1 | 7.5 | 15 DGH | 90 | 91 |

Conditions: Synthetic 3X Recirculating Water; pH 8.5; R.T.; 24 hrs; 9 mg/L Fe; 3 mg/L Mn; 5 mg/L Cl$_2$; 25 micron Filtration.

EXAMPLES 15-20

The previously described test procedure was followed and the effect of increasing the test period from 24 to 48 hours was examined. As shown in Table 4, neither AA/AMPSA nor the PCL-402 combinations were affected by such an increase in time.

TABLE 4

Effect of Time on $Fe^{2+}$ and $Mn^{2+}$ Stabilization

| Example Number | mg/L | Treatment | Time (Hrs.) | PENETRANT (mg/L) | mg/L | Biocide | Corrected % Stabilization Fe | Corrected % Stabilization Mn |
|---|---|---|---|---|---|---|---|---|
| 15 | 50 | PCL-402 | 48 | 5.1 | 6 / 9 | MBT / DBNPA | 94 | 100 |
| 16 | 14.3 / 30 | AA/AMPSA / PCL-402 | 48 | 5.1 | 6 / 9 | MBT / DBNPA | 92 | 100 |
| 17 | 35.7 | AA/AMPSA | 48 | 5.1 | 6 / 9 | H-102 / DBNPA | 76 | 85 |
| 18 | 3.33 | HEDP | 48 | 5.1 | 6 / 9 | MBT / DBNPA | 13 | 11 |
| 19 | 35.7 | AA/AMPSA | 24 | 5.1 | 6 / 9 | MBT / DBNPA | 90 | 89 |
| 20 | 3.33 | HEDP | 24 | 5.1 | 6 / 9 | MBT / DBNPA | 15 | 17 |

Conditions: Synthetic 3X Recirculating Water; pH 8-9; 9.0 mg/L Fe; 3.0 mg/L Mn; 5.0 mg/L Cl$_2$; 24 Hours; 60 rpm; 60° C.; 25 micron Filtration.

EXAMPLES 21-24

The previously described test procedure was followed at 10° C. and at room temperature. As shown in Table 5, the reduced temperature had no impact on iron and manganese stabilization.

TABLE 5

IRON/MANGANESE STABILIZATION COLD WATER STUDY

| Example Number | Temp. (°C.) | AA/AMPSAA-HEDP (mg/L) | PENETRANT (mg/L) | H-102 (mg/L) | % Stabilization Fe | % Stabilization Mn |
|---|---|---|---|---|---|---|
| 21 | 10 | 10 | 0 | 0 | 100 | 100 |
| 22 | 10 | 10 | 3.4 | 4 | 100 | 100 |
| 23 | R.T. | 10 | 0 | 0 | 97 | 100 |
| 24 | R.T. | 10 | 3.4 | 4 | 96 | 100 |

Conditions: Primary Service Water; pH 7.0; 4 hrs; 5 mg/L Cl$_2$; 3 mg/L Fe; 1 mg/L Mn; 25 micron Filtration.

Table 6, below, summarizes the effects of various biocides on iron and manganese stabilization.

TABLE 6

EFFECTS OF SELECTED BIOCIDES ON FE/MN STABILIZATION IN 3X RECIRCULATING WATER

| Biocide(s) | Effect on Stabilization | |
|---|---|---|
| | Fe | Mn |
| H-102 | + | + |
| DMAC | − | 0 |
| DGH | 0 | 0 |
| DMAC/MBT | 0 | 0 |
| DMAC/DBNPA | − | 0 |
| DMAC/DGH | 0 | 0 |
| MI/DBNPA | 0 | 0 |
| DGH/DBNPA | 0 | 0 |

(+ = Positive
− = Negative
0 = Neutral)

What is claimed is:

1. A method for stabilizing metal ions including iron and manganese and inhibiting biofouling in an aqueous system comprising adding to said aqueous system an effective amount of an admixture comprising:

(a) an ethylenically unsaturated water soluble polymer, alone or in combination with a water soluble phosphonate, wherein said polymer has a weight average molecular weight of less than 50,000 as determined by light scattering and comprises (i) an unsaturated mono-carboxylic acid selected form the group consisting of acrylic acid and methacrylic acid; and (ii) an unsaturated sulfonic acid selected from the group consisting of 2-acrylamido-2-methylpropyl sulfonic acid and 2-methacrylamido-2-methylpropyl sulfonic acid; wherein the weight ratio of (i): (ii) ranges from about 1:4 to about 4:1;

(b) methylene bis(thiocyanate); and (c) 2-(thiocyanomethylthio)benzothiazole; wherein the weight ratio of a) to the sum of b) and c) is from about 20:1 to about 1:2 and wherein the weight ratio of b):c) is from about 10:1 to about 1:99, to prevent deposition of said metal ions and inhibit biofouling in said aqueous system.

2. The method of claim 1, wherein said phosphonate is selected from the group consisting of 2-phosphono-1,2,4-tricarboxybutane, amino tri(methylene phosphonic acid), hydroxyethylidene diphosphonic acid, phosphonosuccinic acid, benzene phosphonic acid, 2-aminoethyl phosphonic acid, and polyamino phosphonates.

* * * * *